United States Patent [19]

Stone

[11] Patent Number: 5,575,492
[45] Date of Patent: Nov. 19, 1996

[54] STABILIZER APPARATUS FOR FIFTH WHEEL TRAILERS

[76] Inventor: Jerry E. Stone, 23695 St. John Rd., Athens, Ala. 35611

[21] Appl. No.: 327,964

[22] Filed: Oct. 24, 1994

[51] Int. Cl.$^6$ ..................................... B60S 9/04
[52] U.S. Cl. ................. 280/475; 280/763.1; 248/352
[58] Field of Search .................. 780/475, 418.1, 780/432, 763.1, 840; 248/352, 677, 903, 354.1, 354.5, 354.6, 354.3; 254/418, 419

[56] References Cited

U.S. PATENT DOCUMENTS

| | | | |
|---|---|---|---|
| 2,924,463 | 2/1960 | Livermont | 280/763.1 |
| 3,306,629 | 2/1967 | Oerman et al. | 280/475 |
| 3,933,372 | 1/1976 | Herndon | 280/763.1 |
| 4,231,044 | 10/1980 | Henkel | 280/763.1 |
| 4,429,851 | 2/1984 | DeJager | 280/763.1 |
| 4,708,362 | 11/1987 | Raetz | 280/763.1 |
| 4,905,953 | 3/1990 | Wilson | 280/763.1 |

*Primary Examiner*—Anne Marie Boehler
*Attorney, Agent, or Firm*—Joseph H. Beumer; C. A. Phillips

[57] ABSTRACT

A stabilizer apparatus for fifth wheel trailers uses a pair of assemblies for placement under front corners of the trailer when parked and leveled. The assemblies each include a leveling jack, a diagonal strut-forming leg, and a connecting chain to secure the jack base and foot of the leg together at a desired location. The top end of each leg has a notch to make contact with a pin securely attached to the underside of the trailer near the area where the top of a jack is located. In operation, each leg is located to extend outward from the trailer with its bottom in contact with the ground and its top contacting a pin on the trailer. By lowering the trailer and taking slack out of the connecting chain, the legs are held rigidly in position by the weight of the trailer, and side movement of the trailer is restrained.

5 Claims, 2 Drawing Sheets

STABILIZER APPARATUS FOR FIFTH WHEEL TRAILERS

FIELD OF THE INVENTION

This invention relates to stabilizing of trailers in parked position.

BACKGROUND OF THE INVENTION

Fifth wheel trailers are widely used for travel and recreation as well as for other applications. Trailers of this type normally have a large, generally rectangular body with one or more sets of wheels on each side near the middle, an overhang at the front and a gooseneck hitch, which reaches out and engages a fifth wheel plate in the back of a pickup truck. Upon being parked in a desired location, the trailer may be prepared for use as living quarters or for other purposes by leveling it and taking measures to restrain it from undergoing motions due to action of the wind or movement of occupants inside. Trailers of this type are particularly susceptible to moving in a side-to-side manner at the front.

Various devices have been used to stabilize fifth wheel trailers including scissors jacks; A-frame jacks, which engage the overhang; and telescoping bars. Such of these devices as are known to applicant are unconnected to and operate independently of the leveling jacks furnished with the trailer. Thus, any potential benefit of obtaining additional directional support from existing jacks has not been realized. In addition to making use of this stabilizing capability, more economical and more easily installed stabilizer devices are desired.

SUMMARY OF THE INVENTION

The present invention is directed to a stabilizer device and method which makes use of existing leveling jacks for important structural functions. The apparatus comprises a pair of assemblies, each made up of a trailer leveling jack combined with a strut-forming diagonal stabilizer leg, an adjustable connecting chain, and a fixture installed on a frame on the underside of the trailer for receiving the top of the diagonal leg so as to restrain the leg from moving past the fixture. The base of the trailer jack is connected by the chain to the lower end of the diagonal leg a distance away and directed toward the outside, the diagonal leg of one assembly being placed in line with the other one pointing outward in the opposite direction. In operation, after the trailer is parked and leveled, the front is slightly elevated, and the diagonal legs are put into place and aligned so that a minimum of slack remains between the jack bases and the bottoms of the diagonal legs. The trailer is then lowered back down to a level position, forcing the base of the legs outward. The chains then become tight with respect to the bases of the jacks and the diagonal legs. As a result, the tops of the legs bear firmly against the fixtures on the trailer, keeping the legs from moving inwardly. The two assemblies work in a complementary manner, preventing movement toward either side.

Stabilizers made according to the invention obtain a strong stabilizing effect by tying feet of the diagonal legs to the jack bases, with restraint being imposed by action of the weight of the trailer itself. The number of required parts is minimized, and costs of the device are likewise reduced. In addition, the stabilizer of the invention provides more effective restraint than prior devices.

It is therefore an object of this invention to provide a trailer stabilizer device that makes use of existing trailer leveling jacks as component parts of the stabilizer.

Another object is to provide a trailer stabilizer that is economical to construct.

Still another object is to provide a trailer stabilizer that is highly effective in restraining side-to-side movement.

Other objects and advantages of the invention will be apparent from the following detailed description.

DESCRIPTION OF THE PREFERRED EMBODIMENT

Figure 1:
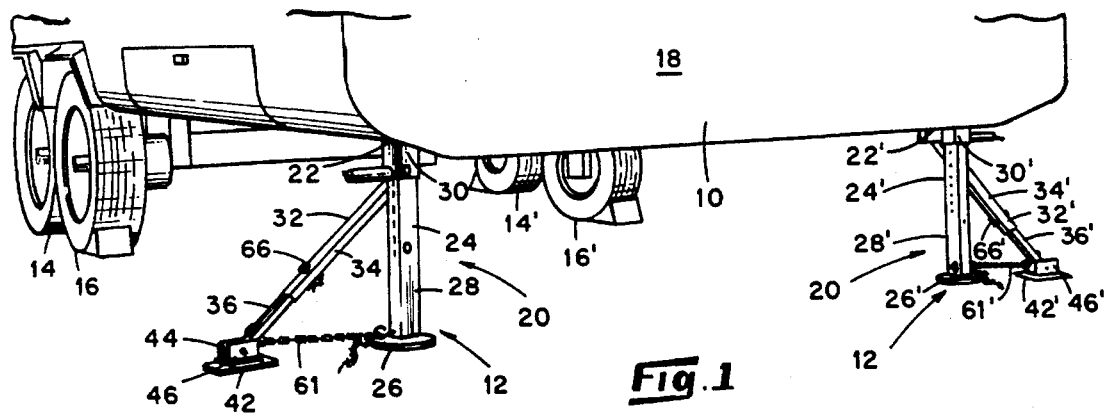
FIG. 1 is a pictorial view showing a pair of stabilizer assemblies mounted under front corners of a fifth wheel trailer.
Figure 2:
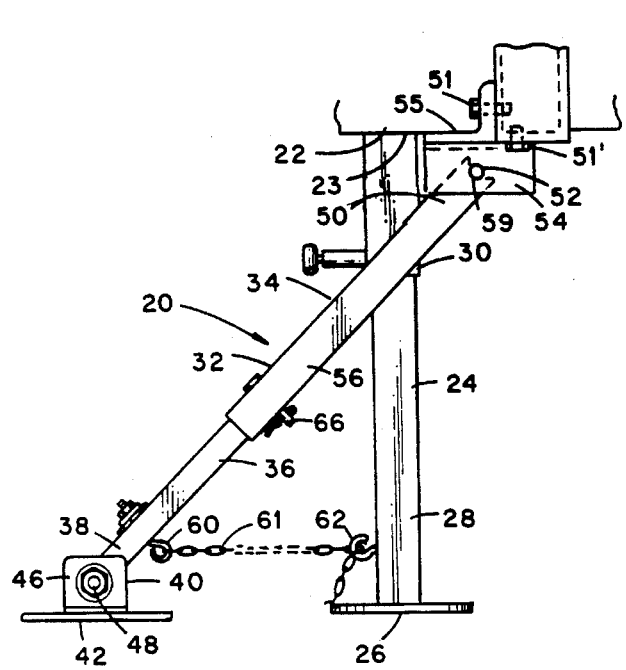
FIG. 2 is a view from the rear showing the left front stabilizer assembly.
Figure 3:
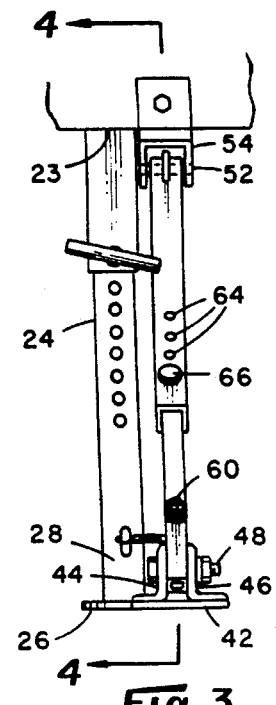
FIG. 3 is a side view showing the left front stabilizer assembly.

Referring to the drawings, a fifth wheel trailer 10 is shown in parked position, leveled and stabilized by apparatus 12 embodying the invention. The trailer has dual rear wheels 14, 14', 16, 16' on both sides and a gooseneck hitch (not shown) extending forward from overhang 18 in front. The stabilizer apparatus includes a pair of assemblies 20, 20', which are mirror images of one another, placed below and in contact with frame members 22, 22' underneath the front corners of the trailer. Any details not identified by reference number in the drawing for one of the assemblies may be derived from a drawing for the other assembly. Each stabilizer assembly has a hydraulic or electric jack 24, 24' of conventional design with a foot pad 26, 26' engaging the ground and an upper end 23, 23' engaging a trailer frame member. Lower leg portions 28, 28' of the jacks telescope up and down within upper portions 30, 30', raising and lowering the corners of the trailer with which they are in contact. Diagonal legs 32, 32' are connected to the jack to restrain the trailer from side-to-side movement. Each diagonal leg has an upper portion 34, 34' which telescopingly receives lower portion 36, 36'. Bottom ends 38, 38' of the legs are pivotally secured to a foot pad 40, 40' having a base plate 42, 42' and a pair of L-shaped members 44, 46 (FIG. 3) welded thereto defining a space for receiving ends 38, 38'. Apertures 47 through the L-shaped members and bottom end 38, 38' receive bolts 48 securing the legs and pads together. When installed and connected as described, each of the diagonal legs in effect forms a strut, restraining the trailer from side-to-side movement.

Upper ends 50, 50' of the legs are shaped to pivotally receive pins 52 supported by inverted U-shaped brackets 54. Top sides of the brackets have welded thereto angled braces 55 which engage protruding ends of frame members 22, 22' from the side. Screws 51, 51' extending through apertures 57, 57' in the braces and in the tops of the brackets provide a secure connection to the frame members. Depending upon the construction of the trailer, the bracket may also be welded to the frame or attached by other means. The brackets are placed so that pins 52 are aligned parallel to the longitudinal axis of the trailer. Front ends of front sides 56 and opposite sides 58 of the legs at upper end 50 have V-shaped notches 59 cut therein, the bottoms of these notches engaging pins 52 when placed in position. This aligns the leg in a plane perpendicular to the axis of the trailer and causes the bottom of the leg to be disposed laterally outward at a right angle to the jack. Upper sides of legs 32, 32' have clips 35, 35' welded on adjacent to the top ends, the clips extending at a right angle partially across the top ends of the legs. The clips are hooked over the pins and serve to restrain the legs from falling down during the assembly procedure.

Bottom ends 38, 38' of the diagonal legs and the lower portions 28, 28' of the jacks are secured to one another with chains 61, 61', which limit outward movement of foot pads 40, 40' away from the jacks. The chains are connected to leg ends 38, 38' by closed eye bolts 60 and to the jacks by open-ended eye bolt 62 near the bottom ends of the jacks. The open-ended eye bolts allow the length of the chain to be adjusted within limits by engaging a selected link of the chain during erection of the assembly as required. A chain length of about 20 inches is suitable for this purpose.

Figure 4:
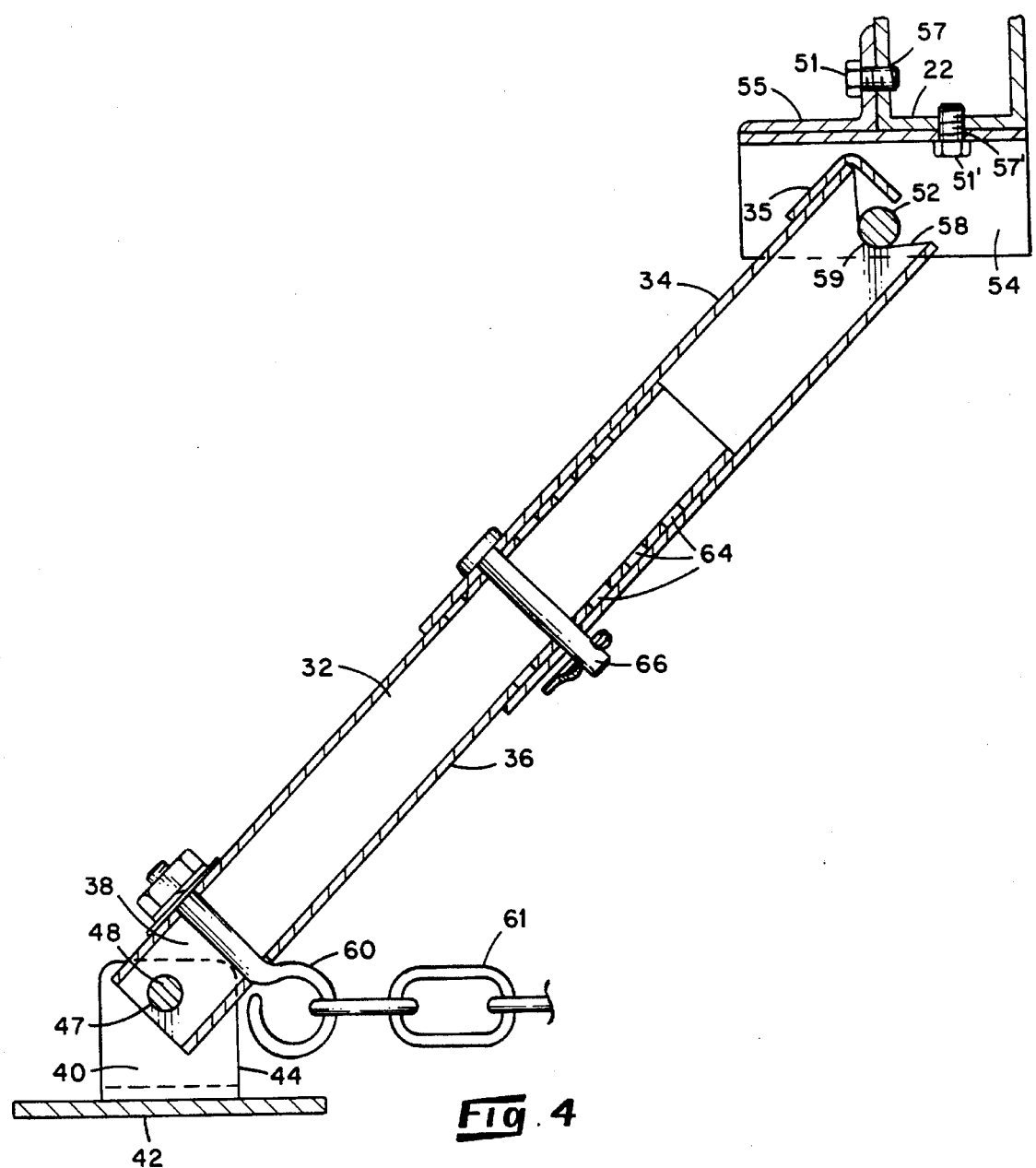
FIG. 4 is a sectional view of a diagonal leg in place, taken along line 4—4 of FIG. 3.

As shown in FIG. 4, the diagonal legs may be adjusted in length to compensate for irregularities in the surface of the ground where the trailer is parked. The legs 32, 32' have an upper portion 34, 34' which telescopingly receives a lower portion 36, 36' and a series of apertures 64 linearly spaced apart and adapted to receive pins 66, 66' which extend through both portions. In operation, the pin is inserted through a selected one of the apertures which provides a length such that notches 59 are in contact with pins 52 at the top, and foot pads 40, 40' are firmly seated on the ground.

Initial leveling of the trailer with the jacks may make use of a bubble-type level installed on the trailer body, with the individual jack heights being adjusted to an indicated level position by raising or lowering. After being leveled, the trailer front is elevated slightly to allow for adjustment of the leg and connecting chain of each assembly. The trailer front may be elevated to the extent of one bubble width for this purpose. With the trailer front in this elevated position, the chains are connected tight enough that any slack is minimized.

To compensate for irregularities in the ground surface, the length of the legs is also adjusted to a desired value such as to give a foot pad location of 12 to 14 inches away from the trailer jack base of each assembly. The chains for connecting the jack bases and the legs would preferably have a length of 20 inches, with length adjustments being made as required for removal of slack. After making required adjustments, the trailer front is lowered back to a level position. The weight of the trailer exerted against the diagonal legs forces the legs outward until the chain tightens and restrains any further movement.

The stabilizer legs of the assemblies involve no parts that move in a manner such as to wear out, and they may easily be plated to deter rusting. They may be made lightweight in construction, and they require no special training or tools to operate. The legs are easily transported and stored due to their size and compact construction. The installation of this stabilizer system on a trailer only requires attachment of the brackets to the trailer frame by use of screws or by welding and installation of open eye bolts on existing trailer jacks.

While the invention is described above in terms of a specific embodiment, it is not to be understood as limited thereto, but is limited only as indicated by the appended claims.

I claim:

1. Apparatus for stabilizing a trailer against undergoing movement when parked and leveled by a pair of jacks placed in operating position under the trailer comprising:

a pair of stabilizer assemblies each comprising a said jack, a strut-forming leg disposable diagonally in proximity to a said jack in the assembly, said strut-forming leg having a top portion engageable with said trailer and a foot engageable with the ground, and a variable link connector comprising a chain attachable to said foot and to a lower portion of said jack;

a pair of studs comprising fixed pins secured to said trailer by inverted U-shaped brackets attached to the trailer and positioned for receiving top portions of said strut-forming legs;

a pair of braces having L-shaped cross sections with first sides connected to said bracket and second sides connected to a frame member of said trailer;

said trailer having a longitudinal axis, and said pins being disposed parallel to said axis;

said legs comprise metal tubing having a rectangular cross section, and opposite top sides of the legs have V-shaped notches defined therein and adapted to engage said pins; and said jacks, strut-forming legs, and connector chains having a relative length such that upon placement of the assemblies underneath the trailer with tops of the strut-forming legs engaging said contact members and attaching the connectors to said lower portions of said jacks and strut-forming legs, slightly lifting the trailer, removing slack from the connector, and lowering the trailer, the weight of the trailer will be distributed between the jacks and legs, and movement of the trailer in the directions of said legs will be restrained.

2. Apparatus as defined in claim 1 wherein said legs include upper and lower portions adapted to telescopically fit within one another and a plurality of apertures spaced apart to receive a pin at variable locations, whereby to allow adjustment of lengths of the legs.

3. Apparatus as defined in claim 2 wherein said chains are secured to said legs and jacks by open eye bolts engageable by one end of said chains and closed eye bolts engageable by the opposite ends of the said chains.

4. Apparatus as defined in claim 3 wherein said strut-forming legs and said chains are adjustable in length so as to provide a distance of 12 to 14 inches between the bases of said jacks and feet of said legs when in final position.

5. Apparatus as defined in claim 4 wherein each of said feet comprises a flat metal plate, a pair of L-shaped members welded thereto and spaced apart, defining a space for receiving a said lower portion of a said leg, and means pivotally connecting said bracket and said lower portion of said leg.

* * * * *